United States Patent [19]

Blake

[11] Patent Number: 5,242,720
[45] Date of Patent: Sep. 7, 1993

[54] COHESIVE FINISHES FOR COMPOSITE MATERIALS

[75] Inventor: Larry D. Blake, Ogden, Utah

[73] Assignee: Wasatch Fiber Group, Inc., Ogden, Utah

[21] Appl. No.: 507,961

[22] Filed: Apr. 11, 1990

[51] Int. Cl.$^5$ .................. A63B 53/10; B32B 1/08; B32B 1/10; B32B 31/12; B32B 31/20

[52] U.S. Cl. .................. 428/34.5; 273/73 F; 273/80 R; 428/34.7; 428/35.9; 428/36.1; 428/36.2; 428/236; 428/251; 428/252; 428/902

[58] Field of Search .............. 428/34.5, 34.7, 35.9, 428/36.1, 36.2, 236, 251, 252, 902

[56] References Cited

U.S. PATENT DOCUMENTS 5,035,764  7/1991  Blake .................. 156/327

Primary Examiner—James C. Cannon
Attorney, Agent, or Firm—Stanley A. Becker

[57] ABSTRACT

An overlay of sheet material that is impregnated with thermosetting resin—typically a fabric of a type including metallic, synthetic fiber, natural fiber and ceramic cloths impregnated with epoxy resin—is wrapped about or laid on an underlay of material that is also impregnated with thermosetting resin—typically a resin material reinforced with fibers of the graphite, glass, aramid, or ceramic types. The overlay and underlay are cured under heat and pressure in an oven at the same time, causing cohesive bonding of the resin within each. The resin exudes through the fabric overlay during curing and forms a hard transparent shell of cured resin to the composite article. The embedded sheet material selectively imparts color, pattern, texture, reflectivity, penetration resistance, tensile strength, thermal and electrical conductivity, and other visual and mechanical properties to the composite article as desired. Exemplary configurations include lustrous metallic-coated cloths upon the surfaces of graphite golf club shafts or vaulting poles or sailboat masts, and electrically conductive cloths conducting electricity upon the surfaces of fiber-reinforced aircraft panels.

27 Claims, 4 Drawing Sheets

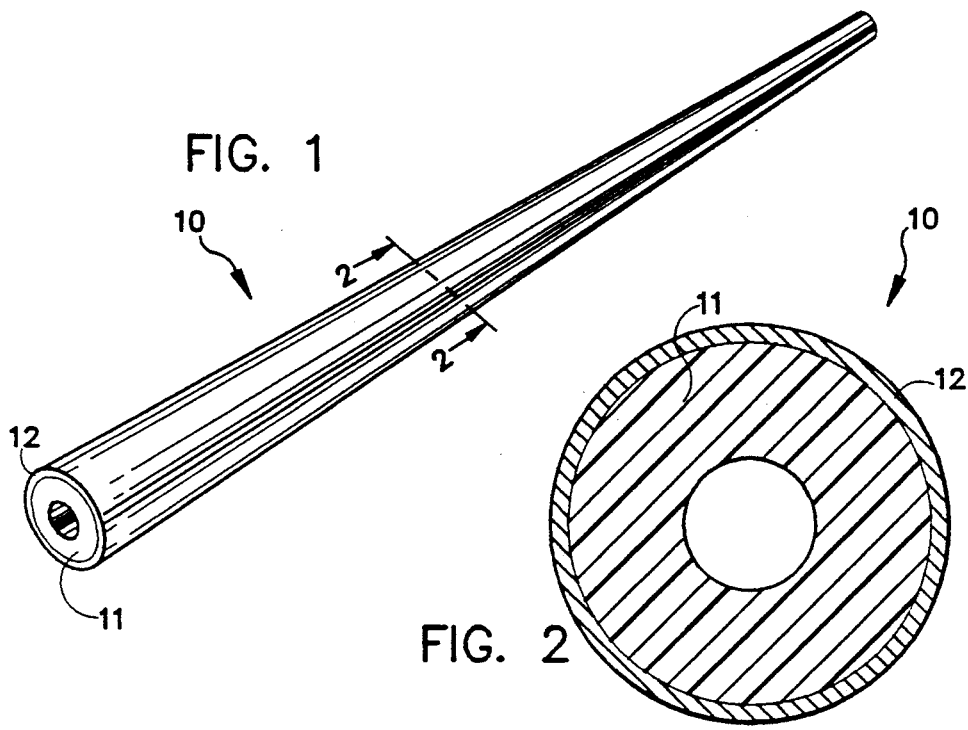
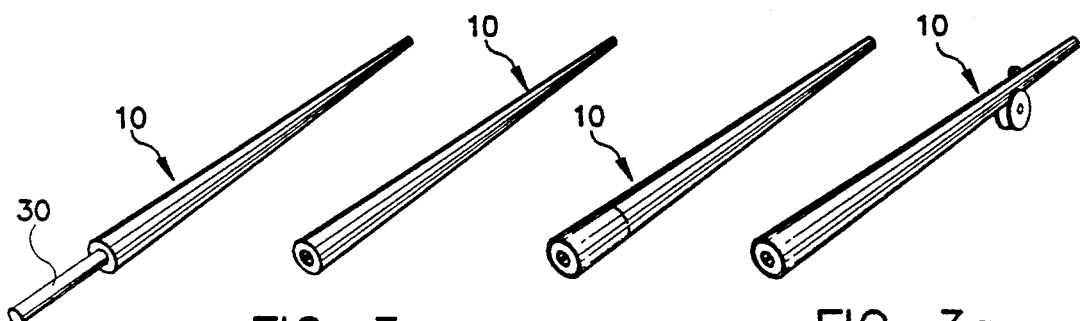
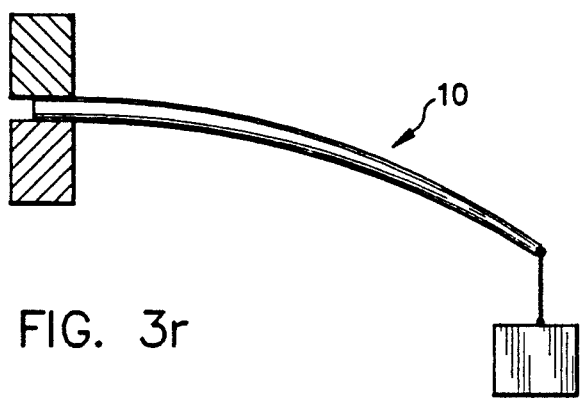

COHESIVE FINISHES FOR COMPOSITE MATERIALS

This is a division of application Ser. No. 07/090,620, filed on Aug. 28, 1987, now U.S. Pat. No. 5,035,764.

BACKGROUND OF THE INVENTION

1. Field of the Invention

The present invention concerns cohesive finishes for materials containing resin, particularly including finishes made from resin-impregnated fabric the resin of which fabric is cohesively bonded to the resin of fiber-reinforced composite materials.

DESCRIPTION OF THE PRIOR ART

The present invention is concerned with the application of a finish, or surface layer, to an article made from a certain class of materials, and with the finish so obtained. Generally within the prior art finishes are applied to articles for many purposes. These purposes include coloring, patterning, and/or altering the surface texture of the article. These purposes also include sealing the surface of the article, improving the article's immunity to weather or other environmental agents, imparting strength and durability to the article, and generally altering selected physical properties of the article. Finishes may particularly serve to provide a surface layer which is distinguished from the underlying material by being harder, impervious to certain agents, colored, patterned, or otherwise differentiated from other regions of the article to which the finish is applied. Painting is well known as a common means of applying a finish to a surface in order to improve the properties of the surface.

Paint and other common finishes are characterized by being adhered, or in adhesion, to the underlying material. Adhesion is the molecular attraction exerted between the surfaces of bodies in contact. A body having an adhered finish, for example paint, is characterized in that at some regions sufficiently distant from the surface there exists only the material of the body whereas at the uppermost regions of the surface there exists only the paint. Adhesion is to be contrasted with cohesion, meaning molecular attraction by which the particles of a body are united throughout the mass. Generally a cohesive body may exhibit differentiation between surface and underlying volumes but this differentiation is not complete, and both the surface and subsurface volumes are intimately molecularly interconnected (often gradually and progressively) and share certain properties.

There is a class of articles for which prior art adhered finishes have not proven to be completely satisfactory. This class of articles are made from the so-called "advanced composite materials", which are resin materials reinforced with fibers such as those of glass, carbon, metal or aramid, or with ceramic filaments. Problems with the finishing of articles made from advanced composite materials are rooted in the exceptional properties of these materials, which properties must be matched if not enhanced by any adhered finish. These properties include strengths exceeding those of high strength steels, stiffness matching that of steel at less than two-thirds the weight of aluminum, fatigue resistance, creep resistance, thermal dimensional stability, wear resistance, damage tolerance, corrosion resistance, and vibration resistance.

Articles made of the advanced composite materials are widely used in exceedingly demanding applications. These applications include aircraft and spacecraft components such as fuselages, ailerons, spoilers, flaps, structural sections, doors, rotor blades, rotor shafts, and fuel tanks. These applications further include vehicular components such as body panels, structural members, shafts, connecting rods, springs, and fuel tanks. These applications further include boat and ship components such as hulls, masts, booms, and winches. Finally, the composite materials find wide application in sporting goods such as fishing rods, tennis rackets, archery equipments, skis and ski poles, protective clothing and helmets, vaulting poles, and golf clubs. In all these applications the stringent requirements made on an article formed of advanced composite material are likewise made upon the finish of the article. The finishes commonly adhered to such surfaces have proven to exhibit problems in meeting such stringent requirements.

For example, perhaps the most common finish for articles made from advanced composite materials is gel coat, or a paint-like substance which is made from a resin, typically epoxy resin, that is compatible to adhere to the article. Structural panels of advanced composite material that are used in cars, boats, and aircraft sometimes have a gel coat of epoxy resin applied at thicknesses ranging up to one quarter inch. One limitation of this prior art gel coat finish is that it is normally not susceptible to being either textured nor patterned, but is generally only smooth and of a uniform color. Another limitation of the finish is that the finish's color is diffused throughout the gel coat and, although this color may be durable, it appears flat and without depth because it is uniform throughout the resin.

Still another important limitation of the prior art gel coat finish is that it is normally very thick and heavy. This defeats some of the advantage of light weight which may have been instrumental in the original choice of a panel made from advance composite material. This added weight is especially disadvantageous in aircraft where paint, or gel coat, thicknesses typically range to one quarter inch and more (especially on leading edges and noses) in order to obtain adequate durability of the finish to abrasion from wind, rain, dirt, and like airborne elements.

Another example of problems with prior art surface finishes to articles made from the advanced composite materials is that the dimensional tolerance of the finish is difficult to control. Variations in the depth of the finish, which is especially common and nearly unavoidable with paint or gel coat, correspondingly alters the dimensions of the article. Certain composite material articles, such as shafts, which must exhibit precise dimensional tolerances are seldom found finished because of this problem.

Related to the problem of uniformity in the depth of prior art finishes to articles made from advanced composite materials, the finishes often exhibit undesirable visual irregularities. These irregularities include undulations, areas of differing roughness and smoothness, and occasional poor area coverage. This may be due to the high general viscosity of resins (including epoxy resins), and their imperfect adaptability to achieving the same uniformity as conventional paint when applied under the same conditions.

Finishes, especially epoxy resin finishes, to articles made from advanced composite materials are often suitable to be applied only under a limited range of controlled environmental conditions. Particularly, the temperature of application and cure must normally be high room temperature ambient or above (inducing discomfort to the applier), and the curing times are often prolonged to many hours or days.

Still another example of problems with prior art finishes to articles made from advanced composite materials is that the finish may detrimentally change the mechanical qualities of the article, particularly its resistance to flexion, tension, compression, distortion, and like spatial stresses. Although finish-induced changes to an article's mechanical properties are sometimes intentionally induced in certain composite material articles such as hard armor, within certain other composite material articles such as those used in sports any finish-induced variation in the intrinsic mechanical properties of the article is considered very detrimental. Fishing rods, golf club shafts, tennis rackets, and vaulting poles in particular are of such modest relative diameters to any surface finish applied that the finish may undesirably alter the precisely predetermined and highly controlled mechanical properties of the article. An undesirable alteration in the magnitude and uniformity of resistance to the mechanical motions of flexion and extension, in particular, may result from the prior art application of an adhered finish, especially if the application is irregular or wears to become so. Flexion, extension, and resistance to torque are properties which are most desired to be established with precision, and maintained constant, in sporting articles. Thus the mechanical properties of a composite material body may actually be altered by its finish, and are often undesirably and uncontrollably so altered in the prior art.

There is sometimes a problem with the durability of finishes adhered to composite material bodies. In many finished composite material bodies that are subject to vibration, shock, torque, and/or dimensional distortion—especially including sporting goods—the adhered finish deteriorates before the underlying composite material. This is understandable since the boundary between the adhered finish and the underlying body, even if molecularly very strong, incurs extreme stress.

Finally, there are certain problems, or at least conditions, with the prior art composite material articles themselves. Sometimes the finish of the article could conceivably help the problem, although the prior art has not even perceived the finishes of such articles to be relevant to these problem conditions. This is possibly because the finishes themselves have been a problem area, and have thus scarcely been expected to contribute to the solution of other problems. One of these problem conditions occurring with some composite material articles is the well known electrically insulating qualities of the advanced composite materials, particularly the fiber-reinforced resin materials. Although the electrically insulating qualities of composite material articles are exploited to good advantage in some applications (such as components for X-ray machines), aircraft panels formed from composite material are not desired to be electrically insulating. Rather, these panels must conduct static electricity and lightning strikes upon the aircraft. Within the prior art they are presently aided to do so by the incorporation of copper wires, or grids, that are imbedded within the composite material. However, this is a poor solution because (i) electrical potential is not rendered everywhere equal on the surface of the aircraft, (ii) the insulator material may ablate if subject to a direct lightning strikes, and (iii) it is difficult and of uncertain reliability to ensure electrical connection to and through the copper wires. Because the provision of an adhered surface finish to aircraft panels has in the past presented its own problems of weight and durability, there has apparently been no consideration in the prior art regarding any contribution to be made by a panel's surface finish to the panel's electrical non-conductivity problem.

Because of difficulties in applying an adhered finish to bodies of composite material so that the finish is of equally superb physical characteristics to the bodies themselves, unfinished composite material bodies are very prevalent at the present time. This prevalence is not warranted. First, even though articles made from advanced composite materials generally exhibit excellent immunity to chemicals, including corrosives, the fibers or filaments of the composite material provide natural passageways into the bodies of the articles. These passageways can, over time, pick up contamination which degrades the article or its surface. Therefore, finishes are protective. Second, a certain public fascination with the visual appearance of articles made from the advanced composite materials, especially with the black surface of graphite fiber reinforced material in use for sporting goods, is already waning. Certain composite material bodies, such a body panels for automobiles, have no significant application in their unfinished and uncolored form, and must be finished for esthetics reasons.

Accordingly, it would be desirable if some manner of providing a finish to the surface of articles made from the advanced composite materials could be derived wherein the finish would possess equally superlative characteristics to the composite material but would still be capable of readily realizing the colors, patterns, textures; lustre, and protection which are generally associated with those lessor finishes, including common paint, which are within the prior art.

SUMMARY OF THE INVENTION

The present invention is embodied in high performance finishes to articles containing resin, such as articles made from advanced composite materials, and in the method of producing these finishes. Finishes in accordance with the present invention are useful for coloring, patterning, texturing, protecting, and/or altering the mechanical, thermal, light reflectivity, or electrical properties of articles made from resin.

In a basic rudimentary, finishing method in accordance with the present invention, a sheet through which resin may pass, such as by permeating or through holes, is applied, such as by wrapping or laying on, to the surface of an article containing resin. The sheet is held in compressive contact with the article, such as by wrapping with tape or encasement in a vacuum bag or mold, while the epoxy in the article is cured, typically thermally while the sheet-covered article is in an oven. During the curing, a sufficient amount of resin exudes from the resin-containing article and passes through the sheet so as to form an exterior shell of cured resin enveloping the sheet and the article. The cured resin of both the article and shell is in cohesive contact through the sheet.

In order to improve the uniformity in thickness and in coverage of the enveloping shell, the preferred embodiment of a finishing method in accordance with the present invention employs a sheet which bears, and which is preferably impregnated with, a resin (and through which sheet resin may thusly pass by permeating) that is compatible with the resin within the article, and that is advantageously the same resin. The preferred method proceeds identically to the basic method. The cured resin shell is made from resin that arose from both the resin-containing article and the resin-impregnated sheet.

The product resultant from the preferred finishing method in accordance with the present invention, and the preferred embodiment of a finished article in accordance with the present invention, includes an underlay, or article body, made from a material that contains a thermosetting resin. The article further includes an overlay of sheet material bearing a resin that is (i) compatible to bond with the resin within the underlay and (ii) thermosetting. Both the resin-containing underlay and the resin-bearing overlay are preferably each impregnated with resin.

Two beneficial effects in particular are realized by the preferred method of the present invention wherein a resin-containing underlay and its resin-bearing overlay are simultaneously cured by heat while under pressure. First, a very strong bond of a cohesive nature is created between the resin within each of the underlay and the overlay. Second, during the curing considerable resin exudes, or oozes, from the resin-containing underlay and flows through the overlay of sheet material. Some resin also exudes from the resin-bearing overlay. This exuded resin forms a generally transparent shell of cured resin upon the exterior surface of the sheet. This shell and the underlying sheet material serve as the finish of the article. The cured resin shell is hard, thin, lightweight, uniform, and durable. It may be transparent, tinted or colored. The sheet below the shell may be advantageously colored, patterned, an/or textured. It imparts a corresponding color, pattern, and/or a slight texture (detectable to a limited extent through the resin shell) to the finished article. Furthermore, the sheet material is possessed of selectable physical and mechanical properties, particularly including reflectivity and conductivity and tensile strength, which are imparted after curing to the composite, finished, article.

In one exemplary, preferred embodiment, product in accordance with the present invention the overlay of sheet material is made from resin pre-impregnated fabric. It is preferably specifically an epoxy resin impregnated cloth made from either synthetic fibers (which may additionally be coated with metal), natural fibers, or from metal or ceramic filaments. The underlay, or article body, is made from fiber-reinforced resin material. It is preferably specifically made from epoxy resin that is reinforced with fibers of graphite, glass, or aramid, or with metal or ceramic filaments. The resin within the underlay is preferably identical to the resin within the overlay, and is normally epoxy resin or other readily available types of thermal curing resin. The preferably resin-impregnated overlay, advantageously the resin pre-impregnated fabric, will not merely adhere to the underlay of material that is preferably impregnated with thermal curing resin, advantageously the fiber-reinforced resin material, but will cohesively bond thereto.

In accordance with a first preferred embodiment of the invention a resin-impregnated fabric is patterned to the contours of a surface of a resin-impregnated article. The patterned fabric is then applied, such as by wrapping or laying on, as an overlay to the surface of the article. The applied fabric is then compacted to the surface of the article, such as by wrapping with tape under tension or by the application of compressive force. Finally, the resin-impregnated article with the resin-impregnated fabric applied thereto is cured in an oven. The tensioned tape, or a compressive force generated by a vacuum bag or mold, maintains the article under pressure doing the curing and defines its contours.

In accordance with a second preferred embodiment of the invention, the overlay sheet material to be applied to the resin-impregnated underlay, or article body, is not itself capable of being impregnated with resin. It is, instead, substantially resin impermeable. The resin impermeable overlay is a flexible sheet material, for example vinyl sheet, that is backed with a material compatible to bond to resin. This flexible sheet material is applied, backed side inwards, to the surface of the article's body. The sheet material includes a number of small holes, or slits, entirely over its surface area (and thus over the underlying surface area of the article body to which it is applied). The sheet material is perforated with these apertures in the form of pinholes or slits either before or after application to the article's body. Alternatively, the sheet material may not exhibit apertures, and may instead be selectively applied to the underlying article body—for example in narrow strips at slight separation—so as to present a number of points generally in the form of cracks wherein passages exist through the overlay.

As in the first embodiment, in the second embodiment in accordance with the present invention the applied flexible sheet material is compressively compacted to the resin-containing article body, and both the article body and its applied sheet material are cured in an oven. During the thermal curing sufficient resin flows through the holes, slits, or cracks of the sheet material so as to coat the substantial entirety of the outer surface of this overlay with resin. This is in addition to the cohesive bonding which occurs between the resin of the article's body and the resin-compatible backing of the sheet material. The composite article so formed exhibits, as does the article formed in accordance with the first embodiment of the invention, a cohesively bonded interconnection between all regions of resin. It also exhibits a hard resin shell upon the surface of the sheet material that serves as an exterior finish to the article.

In accordance with the present invention color, markings, patterns, texture, and other visual and tactile properties may generally be selectively imparted to the surfaces of articles made from resin-containing materials, including articles made from advanced composite materials. These properties are imparted at lesser weight and at lesser complexity, potentially reducing cost, than obtaining these same properties, if they can be obtained at all, by gel coat or paint.

Furthermore, diverse selected physical properties of an article and its surface may be also be enhanced by the cohesive incorporation of selected fabrics. For example, resistance to penetration or cracking may be particularly obtained by use of either armor cloth or other fabrics of high tensile strength. Thermal and light reflectivity and absorption may also be altered. It is possible to make the surface of an electrically insulating resinous material body to be electrically conducting, particularly by cohesive bonding an electrically conductive cloth such as one made from woven metal.

Consonant with the many different properties of flexible sheet materials, including the diverse fabrics, the present invention is further generally adaptable to realizing a finish for resin-impregnated articles that possesses controllably selectable mechanical attributes. Because of the manner of the creation of the finish in accordance with the present invention integrally during the curing of the resin-impregnated articles, no dimensional distortion nor variation is induced in the finished articles. The finish is, because of the cohesive bonding of the resin, of wholly compatible mechanical characteristics with the article. It is highly uniform with well-controlled mechanical properties. The finish can generally be made either inconsequential to the mechanical performance of the article, or of significant mechanical effect, as is desired and as is obtained by a particular choice of the bonded fabric.

BRIEF DESCRIPTION OF THE DRAWINGS

These and other aspects and attributes of the present invention will become increasingly clear upon reference to the following drawings and accompanying specification wherein:

FIG. 1 is a perspective view showing a first sample item, a golf club shaft, made in accordance with the present invention.

FIG. 2 is a cross-sectional view, taken along aspect line 2—2 shown in FIG. 1, showing the composite construction of the golf club shaft shown in FIG. 1.

DESCRIPTION OF THE PREFERRED EMBODIMENT

Figure 3A:
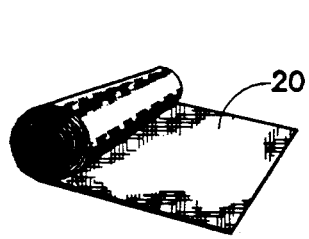
FIG. 3, consisting of FIG. 3a through FIG. 3r, shows the process of manufacture of a first sample item, a golf club shaft, in accordance with one preferred embodiment of the method of the present invention.
Figure 3B:
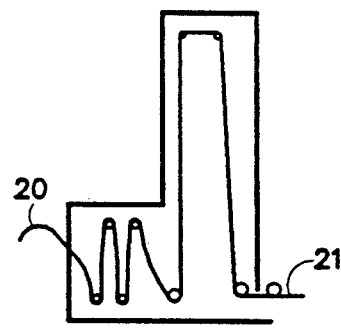
Figure 3C:
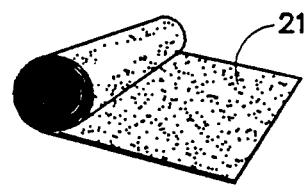
Figure 3D:
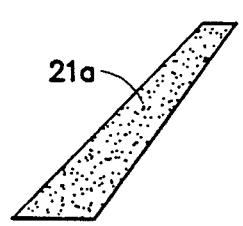
Figure 3E:
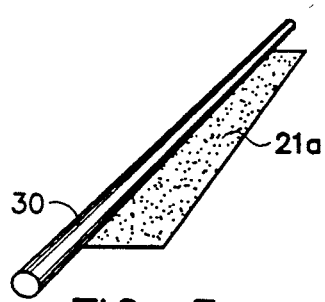
Figure 3F:
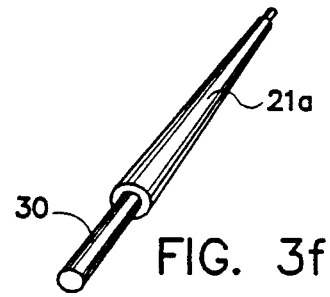
Figure 3G:
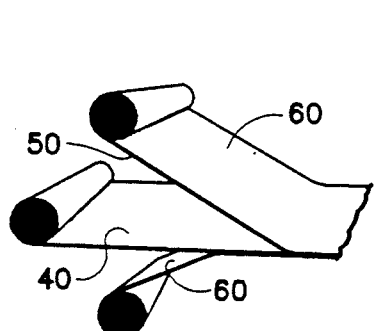

A composite article produced in accordance with the present invention generally exhibits the appearance of having a surface layer integrally upon and bonded to a more extensive underlay, or physical body. The composite article is not laminated because the overlay is not adhesively bonded to the underlay, or applied thereto, but is rather formed integrally therewith. A resin shell of the overlay is cohesively bonded to resin within the underlay. Particularly, the cohesiveness is so great that the exterior resin molecules of the composite body are in chained molecular contact with like resin molecules deep within the interior of the body.

One attribute of an article in accordance with the present invention that makes such article to be of composite construction when its exterior and interior are so similar is that a sheet, or overlay, exists at or slightly below the surface of the composite article. This sheet is completely permeated with (or in the case of impermeable sheet material surrounded by) the resin of the composite body. It might thus alternatively be considered that the present invention is directed to the submerging of a sheet completely within resin at or near the surface of a resinous article. Although the substantial mass, and physical properties, of the composite articles in accordance with the present invention are normally principally resultant from the underlay, the overlaid sheet at the surfaces of such articles selectively imparts desirable features to the surfaces and to the articles.

As a highly specific example in order that the utility of the present invention may be immediately understood, one particular preferred application of the present invention is in the production of composite laminated golf club shafts. A shaft of fiber reinforced thermosetting resin, normally graphite fiber reinforced epoxy resin, is cohesively bonded by heat and pressure to a fabric impregnated with a compatible resin, normally a woven synthetic or natural fiber cloth exhibiting voids which are impregnated with the identical epoxy resin. The cloth is particularly preferred to be nylon or polyester cloth upon which metal has been deposited in vapor form, creating thereby a brilliantly colored and highly lustrous cloth. The composite, cohesively bonded, hard-shelled golf club shaft so formed has a brilliantly colored, slightly textured, and lustrous exterior appearance which is characteristic of the cloth. Above the cloth is a transparent shell of cured resin. The composite shaft possesses the precise dimensions, controlled stiffness, and high durability desired in a graphite fiber golf club shaft. An equivalent construction at a somewhat larger scale produces poles for pole vaulting, and at a considerably larger scale produces masts and booms for sailboats.

Another particular preferred application of the present invention is in composite structural panels, made from resin-containing materials, for use in aircraft, vehicles, boats, and the like. The color, markings, patterns, texture and other visual and tactile properties of these composite panels may generally be established in accordance with the type of sheet that is cohesively bonded at the panels' surfaces. The desired properties are generally imparted at lesser weight, at lessor complexity (potentially reducing cost), and at higher and more uniform quality than obtaining these same properties, if they can be obtained at all, by gel coat or paint. Furthermore, selected physical properties of the panels' surfaces, such as resistance to penetration or cracking, may be also be enhanced by the surface or subsurface cohesive incorporation of sheets made either of armor cloth or other fabrics of high tensile strength, if desired. The thermal and light reflectivity and absorption of the panels may be altered, particularly by the use of thermal and/or light absorbing or reflecting sheets made from materials including metal fabrics.

Another particularly interesting property which may be selectively imparted to the surfaces of resinous articles in conductivity. For this purpose the overlaid sheet is made of electrically conductive material, and is preferably made from electrically conductive fabric, and is more preferably made from metal cloth. Alternative electrically conductive fabrics include nylon, polyester and other fibrous cloths, or ceramic cloth, that have a metal coating deposited thereon.

An example of a composite article in accordance with the present invention—a golf club shaft—is shown in FIG. 1. The underlay of this composite article 10 is a fiber reinforced resin material, and is particularly resin-impregnated graphite fibers 11. The resin-impregnated graphite fibers 11 (alone and without more) are in the shape of a hollow tube, and are commonly referred to as a graphite, or carbon fiber golf club shaft. Such a shaft may be produced in accordance with the teaching of UK Patent No. 1,261,541, the contents of which are incorporated herein by reference. It is equivalently possible that such shaft, or object, could be made from resinimpregnated glass fibers as is taught in U.S. Pat. No. 2,934,345, the contents of which are also incorporated herein by reference. It will be recognized that the shape, and type, of the underlaid fiber-reinforced resin material could be diverse and still be appropriate for combination with an overlay in accordance with the present invention. Particularly, the body or shaft could also be made from resin-impregnated aramid fibers, resin-impregnated ceramic filaments, and diverse materials which are impregnated with thermosetting resin whether or not incorporating fibers.

Continuing in FIGS. 1 and 2, the composite article golf club shaft 10 has an overlay 12 that is preferably made of material impregnated with a resin compatible to bond with the resin within the underlaid resin-impregnated graphite fibers 11. The overlay 12 preferably was first impregnated, or permeated, with this "compatible" resin prior to its cohesive bonding to the resin within underlay 11. Forbearing that overlay 12 should have been so "preimpregnated" then it must (in a first embodiment of the invention) have become so impregnated during the curing by heat and under pressure (to be discussed). The ability to obtain uniform impregnation of the fabric and a uniform resin shell to the composite golf club shaft 10 in that unoptimal case when the overlay 12 is not preimpregnated with resin is a function of the viscosity of the resin, the permeability of the overlay 12, and the pressure under which the curing transpires. If the overlay 12 is not preimpregnated with resin then there is an increased risk that the finish of the composite golf club staff 10 will not be uniform. Consequently, it is much preferred that the overlay 12 should have been preimpregnated with a compatible resin to the resin within underlay 11.

The overlay 12 is particularly preferably made of resin impregnated fabric, and is preferably made of resin-impregnated metal-colored synthetic fiber cloth. Such cloth is readily available in a wide range of weaves and colors that are typically coated with diverse metals by vapor deposition. In accordance with the present invention, it is also possible to employ regular synthetic fiber cloth (particularly including cloth made from nylon, polyester, acrylic, and aramid or polyimid fibers), natural fiber cloth (particularly including cloth made from cotton or flax) and metal or ceramic filament cloth. No matter which of these cloths is used, the resin impregnation ensures that the composite article 10, or golf club shaft, will exhibit a uniform resin finish.

This resin, typically epoxy resin, is normally transparent. It will assume a thickness of approximately 2 to 10 mils above the fabric (which is adjustable in accordance with the method of the present invention explained hereinafter) and provides a hard transparent shell to the composite article 10 through which the embedded fabric is visible. The embedded fabric will, in accordance with its own texture, impart a slight texture to the surface of the composite article, or golf club shaft, 10. This texture is slightly rough but is not abrasive. The natural color of the resin-impregnated graphite fibers 11 is black and so shows in all surface regions (if any) not covered by the overlay. Otherwise, the surface of the composite article 10 is of lustrous bright color in all regions where the overlay of resin-impregnated metal-coated cloth has been applied.

The composite article so formed is characterized in that the resin of the fabric and the resin of the article's body is completely cohesively co-mingled and contiguous throughout the composite article, with no discernible separation or joint between the underlay and the overlay in the cured article. Some resin will be upon the exterior of the article and fabric, and this resin provides a uniformly hard and smooth shell through which, when the resin is transparent or translucent, the fabric is clearly visible. The fabric may be colored and patterned, and may also, in accordance with its roughness and thickness, impart a slight texture to the surface of the composite article even though it is contained within a resin shell.

A first embodiment of a method in accordance with the present invention directed, for example, to producing the golf club shaft 10 shown in FIGS. 1 and 2, is illustrated in FIG. 3. The production steps illustrated in FIGS. 3a through 3f are conventional in the prior art. A carbon or graphite cloth 20 is available from many manufacturers including Torayca, Hercules, Hexcel, SEP, and Textron. The graphite cloth 20 is illustrated to be preimpregnated with a resin in FIG. 3b. The resultant product is called a prepreg, and is normally available directly from the manufacturer. The prepreg 21 is cut into patterned prepreg 21a, and wrapped about mandrel 30 as shown in FIGS. 3d–3f. A linear tube, or shaft, is formed about the mandrel 30.

Figure 3H:
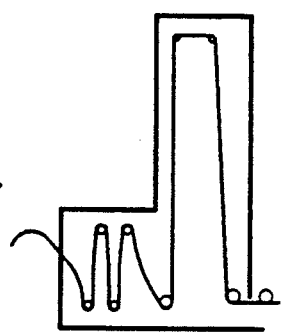
Figure 3I:
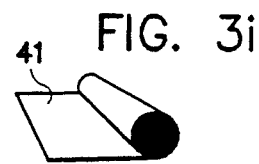
Figures 3J, 3K:
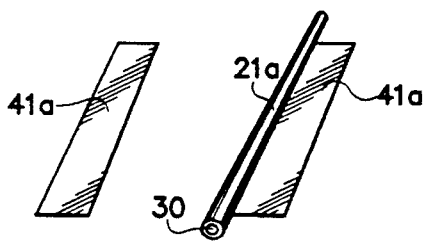

Meanwhile, the preparation of an overlay in accordance with the present invention is illustrated in FIGS. 3g–3j. The overlay 41 is typically made from a fabric 40 which is preferably a cloth. The cloth is generally made from nylon, polyester, metal, ceramic, or other type of woven or non-woven material. The cloth is usually not available pre-impregnated with resin. In accordance with the present invention, the preferred method for impregnating the fabric 40, or cloth, is to apply a thin sheet of resin 50, already applied to a sheet of release paper 60, to a one side of the fabric 40 while directly applying another sheet of release paper 60 to the other side of fabric 40. The sandwich of release paper, fabric, resin, and release paper is then put into a vacuum table (not illustrated). The vacuum table is evacuated, and heat and pressure of approximately 15 pounds per square inch (psi) is applied to fully impregnate the fabric with the resin. Alternatively, a conventional resin-impregnating machine as shown in FIG. 3h maybe used to impregnate fabric with resin equivalently to the manner in which prepregs are impregnated (as previously illustrated in FIG. 3b). Whether the fabric 40 is impregnated upon a vacuum table, or in an impregnating equipment as illustrated in FIG. 3h, a resin-impregnated fabric 41 as illustrated in FIG. 3i is produced. A single-ply of the pre-impregnated fabric is cut to a predetermined pattern 41a (as illustrated in FIG. 3j) for application to the surface of the article.

Figure 3L:
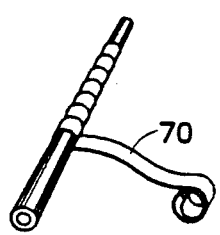
Figure 3M:
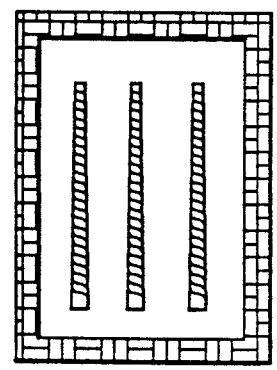

In accordance with the present invention, the patterned and resin pre-impregnated fabric 41a is applied to the uncured article body made from fiber-reinforced resin material 21a by being wrapped around such article body (as illustrated in FIG. 3k), or by being laid on the article body as the case requires. Next, the applied resin-preimpregnated fabric overlay is precompacted to the article body. This may occur either by a tape wrapping under tension as shown in FIG. 3l, or by the application of compressive forces. The tape may optionally be shrink tape which grasps more tightly when heated, but this is not necessary. The wrapped article is then cured in an oven as illustrated in FIG. 3m. The wrapped article may alternatively be emplaced in a vacuum bag or a mold and cured in an autoclave oven. The essential point of the curing step is that adequate heat and temperature is applied for an adequate time so as to completely cure the resin throughout the entire wrapped article, and that the article is confined under pressure by the tape or the vacuum bag or the mold for the duration of this curing. It should be understood that this is the first time at which either the resin within the fiber-reinforced resin material 21a, or within the resin-preimpregnated fabric material 41a, has been cured.

The resins within the fiber-reinforced resin material 21a, and within the resin-preimpregnated fabric 41a, are compatible, and are preferably identical. The resins are typically epoxy or other thermosetting resin. During the curing process as illustrated in FIG. 3m the resins within the fiber-reinforced material 21a, formed as a shaft, typically wick through the overlay of resin-preimpregnated fabric 41a, flow out through the spiral wrappings of tape 70, and drip onto the floor of the oven. The exterior dimensions of the cured composite article, particularly its diameter, is determined by the compression of the tape 70 which is wrapped around the shaft. The interior diameter of the shaft 10 is determined by the mandrel 30. The production of a quality, uniform, shell is controlled by the temperature of the oven within which the product is cured, and by the flow viscosity of the resin. Generally all these factors are tightly controllable, and the produced article, such as the golf club shaft 10 shown in FIGS. 1 and 2, will possess precise dimensions at tight tolerances and a uniform finish of high quality. This is true even though a sheet of a different material than the article body has been integrally applied to, and bound within, the composite article.

This maintenance of tight dimensional tolerances should be compared to attempting to apply a finish to an already cured shaft by wrapping with adhesive sheet material, by adhering a laminate layer, or by sanding and painting. These prior art surface treatments generally induce variation, and potential distortion, in the article which are well in excess of the tolerances to which the article was originally formed. Both sanding (or grinding) and painting, in particular, are very hard to control to precise tolerances.

Further, conventional, steps in the production of an article, typically a golf club shaft 10, from resin material are illustrated in FIGS. 3n–r. The mandrel is released from the cured shaft as illustrated in FIG. 3n, and the shrink tape wrapped around such shaft is also released as illustrated in FIG. 3o. The shaft is cut to length as shown in FIG. 3p, and protrusions resulting from seepage through the tape 70 during the curing are ground away as illustrated in FIG. 3q. Normally within the prior art further surface finishing steps such as painting would next be shown to occur, following the surface grinding and polishing step shown in FIG. 3q. However, in accordance with the present invention, the texture, color, pattern, and other characteristics of the surface of the composite article are already established as desired, and no further surface treatment steps are required or desired. The step illustrated in FIG. 3r is inspection, for example a test of flexure resultant from loading with a weight.

The resin-impregnated fabric material 41a (shown in FIG. 3j–l) may, or may not, have been chosen to significantly affect the mechanical properties of the finished article. In the case of a golf club shaft, the fabric is normally intentionally chosen so as to not significantly affect the strength, stiffness, and flexure of the finished article. However, in conjunction with other types of resin-containing material, including fiber-reinforced resin containing material used in structural panels for vehicles, ships, and aircraft, it may be desirable that the penetration, resistance, and/or strength of such panels should be increased by choice of the fabric thereof. Particularly, armor-type fabrics, including the cohesively bonded within; and at, the outermost regions aramid and polyester fiber soft armors, can impart enhanced penetration and abrasion resistance to a body's surface. Certain other fabrics, such as the graphite fabrics, which have extremely high tensile strength can impart crack resistance to surfaces, especially in conditions of stretching stress. Finally, fabrics like the metal cloths and the ceramic filament cloths can alter the thermal reflectivity, absorption, and heat tolerances of the surfaces of articles to which they are cohesively bound.

A second preferred embodiment of a fabrication method in accordance with the present invention is illustrated in FIG. 4, consisting of FIG. 4a through FIG. 4k. The article illustrated to be produced therein is, for example, a tennis racket. The second embodiment of a method in accordance with the present invention is particularly concerned with the cohesive bonding of a flexible sheet material which does not present voids (oppositely to a fabric), and which consequently cannot be impregnated with resin, to the surface of a resin-containing body. The basic manner by which this will be accomplished is to emplace a sufficient number of openings within the surface of the flexible sheet material so that resin will escape from the resin-containing body through such openings during curing and will form a hard shell upon the top of the sheet material and at the surface of the composite article.

Figure 4A:
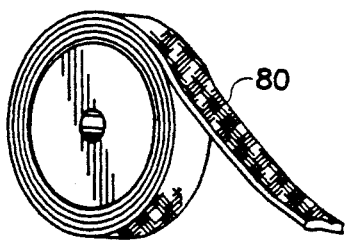
FIG. 4, consisting of FIG. 4a through FIG. 4k, shows the manufacture of a second sample item, a tennis racket, in accordance with another preferred embodiment of the method of the present invention.
Figure 4B:
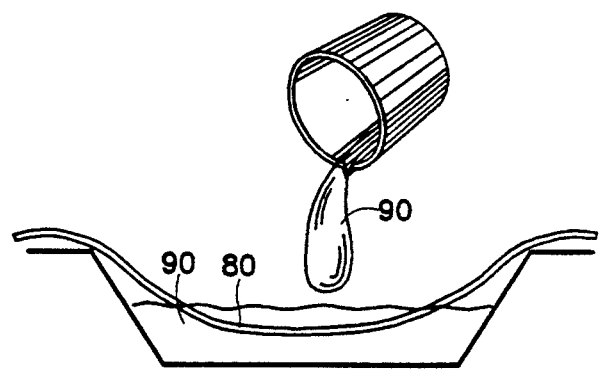
Figure 4C:
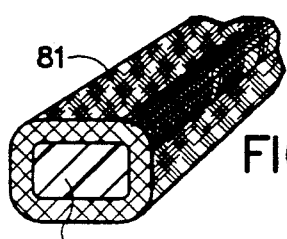

Steps illustrated in FIGS. 4a through 4c are conventional in the process of producing a tennis racket from fiber-reinforced resin material. FIG. 4a illustrates a braided material, typically graphite-fiber reinforced braid, which is available from Torayca and other manufacturers. In FIG. 4b it is illustrated that this braided material 80 is impregnated with resin 90 by simple immersion. In FIG. 4c the resin-impregnated braid material 81 is illustrated to be wrapped around a core 100, typically made of polyethylene foam, in order to form the substantial contour of a frame of the tennis racket.

Figure 4D:
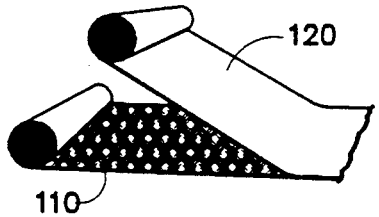
Figure 4E:
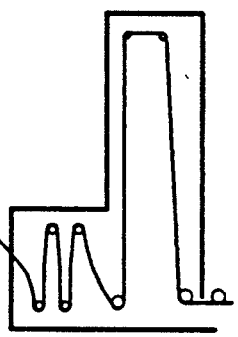
Figure 4G:
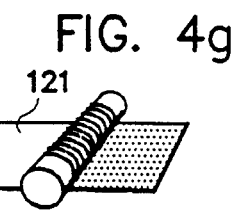
Figure 4H:
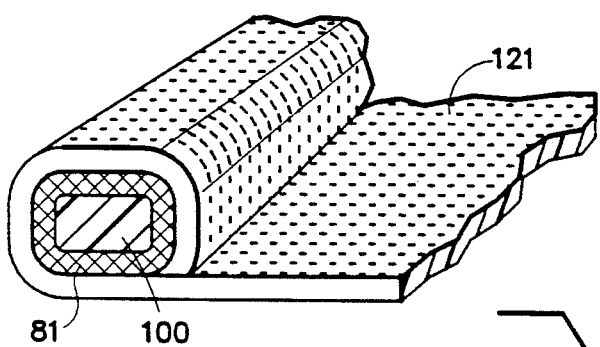
Figure 4F:
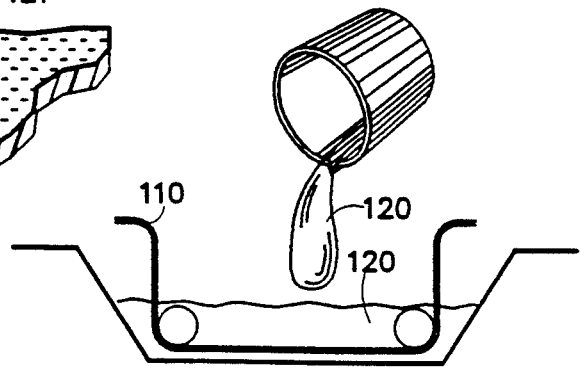

Meanwhile, a substantially resin-impervious flexible sheet material 110 has a backing 120 applied as illustrated in FIG. 4d. The material of the backing 120 is either the same as, or compatible with, the resin 90. This backing 120 may be applied in a machine similar to an impregnating machine as illustrated in FIGS. 4d and 4e, or may be applied simply by immersing the impermeable sheet material 110 within the backing material 120. It may be that the backing material 120 appears upon both sides of the sheet material 110, but this is neither necessary nor harmful if it does occur. A backed sheet material 121 illustrated in FIG. 4g is produced.

Figure 4I:
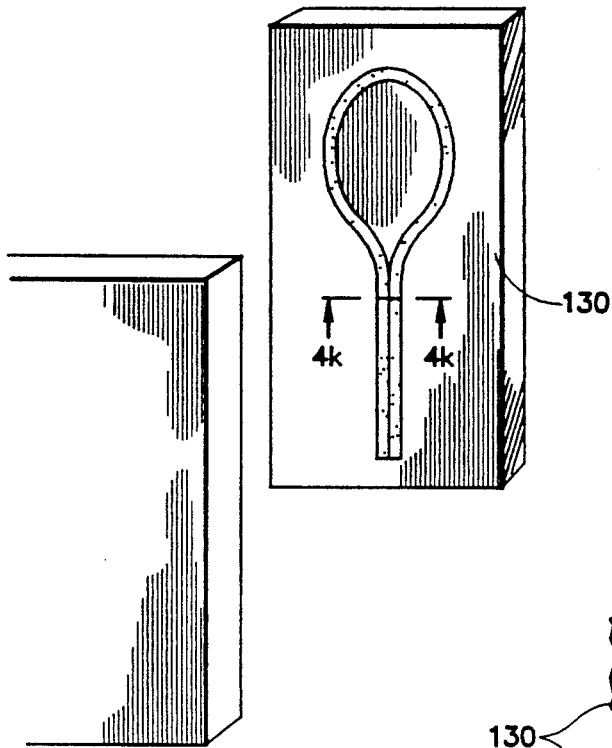
Figure 4J:
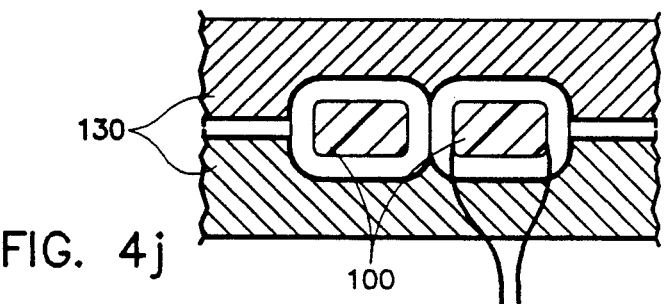

In accordance with the present invention, the sheet material 121 backed with a substance that is either the same as or compatible with resin is wrapped about, or otherwise laid on, the article in a manner so that a multiplicity of openings are presented through the sheet material 121 to the body of the article. This may be accomplished by pre-perforation of the backed sheet material 121 as illustrated in FIG. 4g with a great multiplicity of slits, pinhole apertures, or the like. Alternatively, any perforation may be postponed until the sheet material has been applied to the article, giving the article the appearance illustrated in FIG. 4h. The perforations of the sheet material should be sufficiently numerous and closely spaced so as to allow resin to escape from the underlying resin-containing material 81 during the curing process (as illustrated in FIGS. 4i–j) so as to completely form a hard resin shell over the sheet material in the finished item. The perforations can be more numerous, and/or individually larger, and/or more closely spaced than this minimal level as is desired, but with attendant impact upon the visual, and essential mechanical, characteristics of the finished item. The perforations can usually be made sufficiently small so that they are scarcely noticeable to the naked eye in the completed composite article.

Figure 4K:
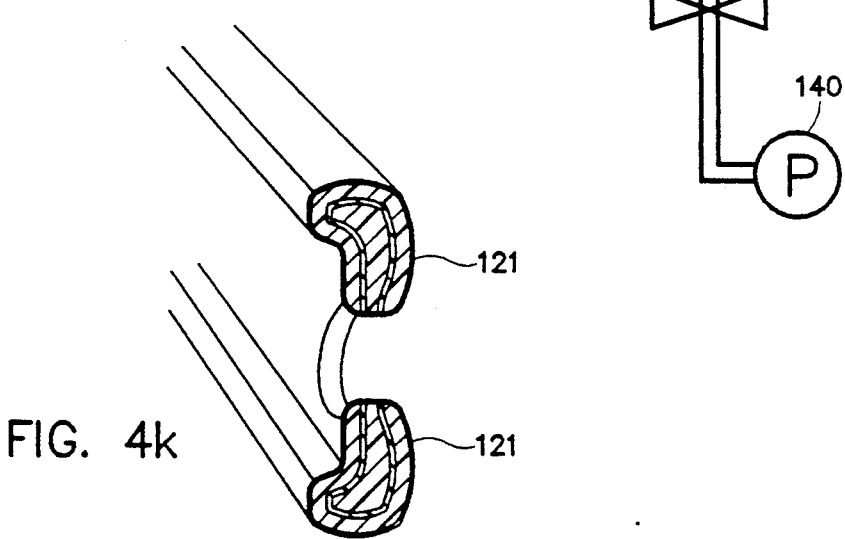

Particularly for the sample structure of a tennis racket, the core 100 material with the resin-impregnated braid 81 wrapped thereabout, and with the backed sheet material 121 still further wrapped about this structure, is emplaced in a mold 130 as illustrated in FIG. 4i. The curing under heat in the mold as illustrated in FIG. 4j is usually while pressurized air is supplied from air source 140 to a one end of the core 100 while the other end of the core 100 is blocked airtight. A cross-section of the tennis racket article so produced, taken at the juncture of the handle to the frame of the racket, is shown in FIG. 4k. This cross-sectional view reveals that the structure and shape of the composite article has assumed the shape of the mold, with the flexible sheet material 121 disposed slightly below a surface of hard resin. As with the previous incorporation of fabric within the cohesively bonded body of the composite article, the flexible sheet material 121 may impart colorations, patterns, and/or visual, tactile, or mechanical properties to the finished article.

In accordance with the preceding discussion of two major embodiments for implementing the principles of the present invention, it is obvious that nearly any flexible sheet, whether fabric or not, may be embedded, and cohesively bonded, at the surface of a resin-containing body. At this surface location the sheet can impart specialized properties to the body as required. The color, pattern, texture, penetration resistance, tensile strength, thermal and light reflectivity and absorption, and enhanced immunity to selected chemical agents may all be selectively addressed by sheet at, or proximate to, the surface of a resin-containing body. Generally a sheet, or fabric, material may be chosen that will obtain better results at less weight and cost than would alternatively be obtained by the application of paint of gel coat to a cured resin-containing body.

Sometimes properties can be obtained by a surface cohesive bonding of a sheet in accordance with the present invention wherein these properties are even not realizable by adhesion of other finishes to the cured body. Particularly, the cohesive bonding of electrically conductive, metallic, cloth will allow the establishment of electrical conductivity at the surface of a resin-containing body which is otherwise electrically insulating. This property is particularly useful in aircraft for the dissipation of static electricity amongst and through the panels of the aircraft, and for the channeling of electrical current resultant from lightning strikes.

Another such property obtainable only by cohesive bonding occurs when the bleeding of the resin from the resin impregnated body during curing is intentionally used to create colorations effects. Particularly, the thermosetting resin impregnating the underlaid material may be made to be of a different color than either the overlaid sheet material or the resin impregnating the overlaid material. When this different color resin bleeds through the overlaid material and its impregnating resin during the thermal setting then the predominant color of the composite material will be the different color. Color striations and gradient variations may also be obtained. Often the overload material is substantially light colored and the resin impregnating this overlaid material is clear.

In accordance with the preceding discussion, the present invention should be perceived to deal broadly with the integration of sheet material, particularly including fabrics, into the surface regions of resin-containing bodies. Accordingly, the present invention should be defined by the following claims, only, and not solely by those preferred embodiments within which the present invention has been taught.

What is claimed is:

1. A composite article comprising:
   underlay containing thermoset resin;
   an overlay cohesively bonded by the thermoset resin to the underlay; and
   a shell of thermoset resin upon the exterior of the overlay as an article finish layer formed from resin which oozed from the resin-containing underlay and passed through the overlay during a thermal curing of both the underlay and the overlay.

2. The composite article according to claim 1 wherein the overlay also contains thermoset resin and the shell of thermoset resin is derived in part from resin which oozed from the resin-bearing overlay during said thermal curing.

3. The composite article according to claim 2 wherein the resin within the resin-bearing overlay and within the resin-containing underlay are cohesively bonded by simultaneously curing the resin of the overlay and underlay.

4. The composite article according to claim 2 wherein the overlay comprises:
   resin-impregnated fabric.

5. The composite article according to claim 4 wherein the resin-impregnated fabric comprises:
   metallic fiber cloth.

6. The composite article according to claim 4 wherein the resin-impregnated fabric comprises:
   synthetic fiber cloth.

7. The composite article according to claim 4 wherein the resin-impregnated fabric comprises:
   natural fiber cloth.

8. The composite article according to claim 4 wherein the resin-impregnated fabric comprises:
   ceramic cloth.

9. The composite article according to claim 1 wherein the underlay comprises:
   fiber-reinforced resin.

10. The composite article according to claim 9 wherein the fiber-reinforced resin comprises:
    resin-impregnated graphite fibers.

11. The composite article according to claim 9 wherein the fiber-reinforced resin comprises:
    resin-impregnated glass fibers.

12. The composite article according to claim 9 wherein the fiber-reinforced resin comprises:
    resin-impregnated aramid fibers.

13. The composite article according to claim 9 wherein the fiber-reinforced resin comprises:

14. The composite article according to claim 1 wherein the overlay has a different color than the underlay.

15. The composite article according to claim 1 wherein the overlay has a different pattern than the underlay.

16. The composite article according to claim 1 wherein the overlay has a different texture than the underlay.

17. The composite article according to claim 1 wherein the underlay comprises:
    black graphite fibers; and
wherein the overlay comprises:
    metallic cloth of a color other than black.

18. The composite article according to claim 2 wherein the thermosetting resin contained in the underlay has a different color than either the overlay or the resin bore by the overlay, and bleeds through the overlay and its resin during the thermal setting so that the predominant color of the composite article is that different color.

19. The composite article according to claim 18 wherein the overlay is substantially light colored and the resin borne by the overlay is substantially clear.

20. The composite article according to claim 1 wherein the underlay is electrically insulating and wherein the overlay is electrically conducting.

21. A composite article comprising:
    a material permeated with resin;
    a layer of resin-impermeable material having a plurality of passages therethrough; and
    a shell of resin upon the exterior of the layer of resin-impermeable material formed from resin which oozed from the resin of the material through the passages during a thermal curing of the material permeated with resin and the layer of resin-impermeable material.

22. The composite article according to claim 21 wherein the passages are in the form of slits.

23. The composite article according to claim 21 wherein the passages are in the form of an array of pinholes.

24. A composite material comprising:
    an underlay containing graphite fibers;
    an overlay of cloth; and
    a thermoset resin shell on the exterior of the cloth overlay and impregnated through the cloth overlay and graphite fibers to cohesively bond the cloth overlay to the underlay.

25. A composite shaft comprising:
    a shaft of fiber-reinforced thermosetting resin;
    a fabric impregnated with a resin compatible to bond with the resin of the shaft surrounding said shaft; and
    a shell of thermoset resin upon the exterior of said fabric formed from resin which oozed in part from the shaft and passed through the fabric during thermal curing.

26. The composite shaft according to claim 25 wherein the fiber-reinforced thermosetting resin comprises:
    graphite fiber-reinforced epoxy resin; and
wherein the fabric impregnated with resin comprises:
    metallic fiber cloth exhibiting voids impregnated with epoxy resin.

27. The composite shaft according to claim 26 wherein the metallic fiber cloth has a different color than the graphite fiber-reinforced shaft.

* * * * *